United States Patent
Gawlas et al.

(10) Patent No.: US 9,913,126 B2
(45) Date of Patent: Mar. 6, 2018

(54) SUBSCRIPTION MANAGEMENT

(71) Applicant: GIESECKE & DEVRIENT GMBH, München (DE)

(72) Inventors: Florian Gawlas, München (DE); Daniel Albert, München (DE); Leif Östling, Bromma (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/312,269

(22) PCT Filed: May 12, 2015

(86) PCT No.: PCT/EP2015/000994
§ 371 (c)(1),
(2) Date: Nov. 18, 2016

(87) PCT Pub. No.: WO2015/176808
PCT Pub. Date: Nov. 26, 2015

(65) Prior Publication Data
US 2017/0086059 A1   Mar. 23, 2017

(51) Int. Cl.
*H04W 12/04* (2009.01)
*H04W 8/18* (2009.01)
*H04W 4/00* (2018.01)
*H04W 8/20* (2009.01)

(52) U.S. Cl.
CPC ........... *H04W 8/183* (2013.01); *H04W 4/003* (2013.01); *H04W 8/20* (2013.01); *H04W 12/04* (2013.01); *H04M 2203/6063* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,113,765 B2* | 9/2006 | Minear | ............... | H04L 63/10 |
| | | | | 455/405 |
| 7,433,675 B2* | 10/2008 | Lucidarme | ............ | H04W 88/02 |
| | | | | 455/406 |
| 2003/0163558 A1* | 8/2003 | Cao | .................... | H04L 12/5692 |
| | | | | 709/223 |

(Continued)

FOREIGN PATENT DOCUMENTS

| EP | 2437530 A1 | 4/2012 |
|---|---|---|
| EP | 2693784 A1 | 2/2014 |
| FR | 2945143 A1 | 11/2010 |

OTHER PUBLICATIONS

Extended European Search Report for corresponding European Application No. 14001782.3, dated Nov. 10, 2014.

(Continued)

*Primary Examiner* — Cindy Trandai
(74) *Attorney, Agent, or Firm* — Workman Nydegger

(57) ABSTRACT

A security element of a mobile device comprises a service-provider network subscription associated with a service provider. The security element is arranged such that the service-provider subscription is employable parallel to a user network subscription installed on the security element. A service associated with the service provider thus becomes utilizable on the basis of the service-provider subscription, independently of a user subscription that might be present on the same security element.

16 Claims, 3 Drawing Sheets

(56) References Cited

U.S. PATENT DOCUMENTS

| | | | |
|---|---|---|---|
| 2007/0086372 A1* | 4/2007 | Lee .................. | G06F 21/10 370/328 |
| 2009/0191857 A1* | 7/2009 | Horn .................. | H04W 4/00 455/419 |
| 2011/0060816 A1* | 3/2011 | Kumar .............. | H04L 41/0813 709/223 |
| 2013/0219481 A1* | 8/2013 | Voltz ................ | H04L 63/0861 726/9 |
| 2013/0227137 A1 | 8/2013 | Damola et al. | |
| 2014/0101449 A1* | 4/2014 | Trujillo Gonzalez ............... | H04W 8/183 713/171 |
| 2014/0106713 A1* | 4/2014 | Skog ................ | H04W 8/183 455/411 |
| 2015/0281966 A1* | 10/2015 | Griot ................ | H04W 12/08 726/5 |
| 2016/0055197 A1* | 2/2016 | Caro ................ | G06F 17/30309 707/695 |
| 2016/0316372 A1* | 10/2016 | Daksiewicz ......... | H04W 12/08 |

OTHER PUBLICATIONS

International Search Report for corresponding International PCT Application No. PCT/EP2015/000994, dated Aug. 18, 2015.

* cited by examiner

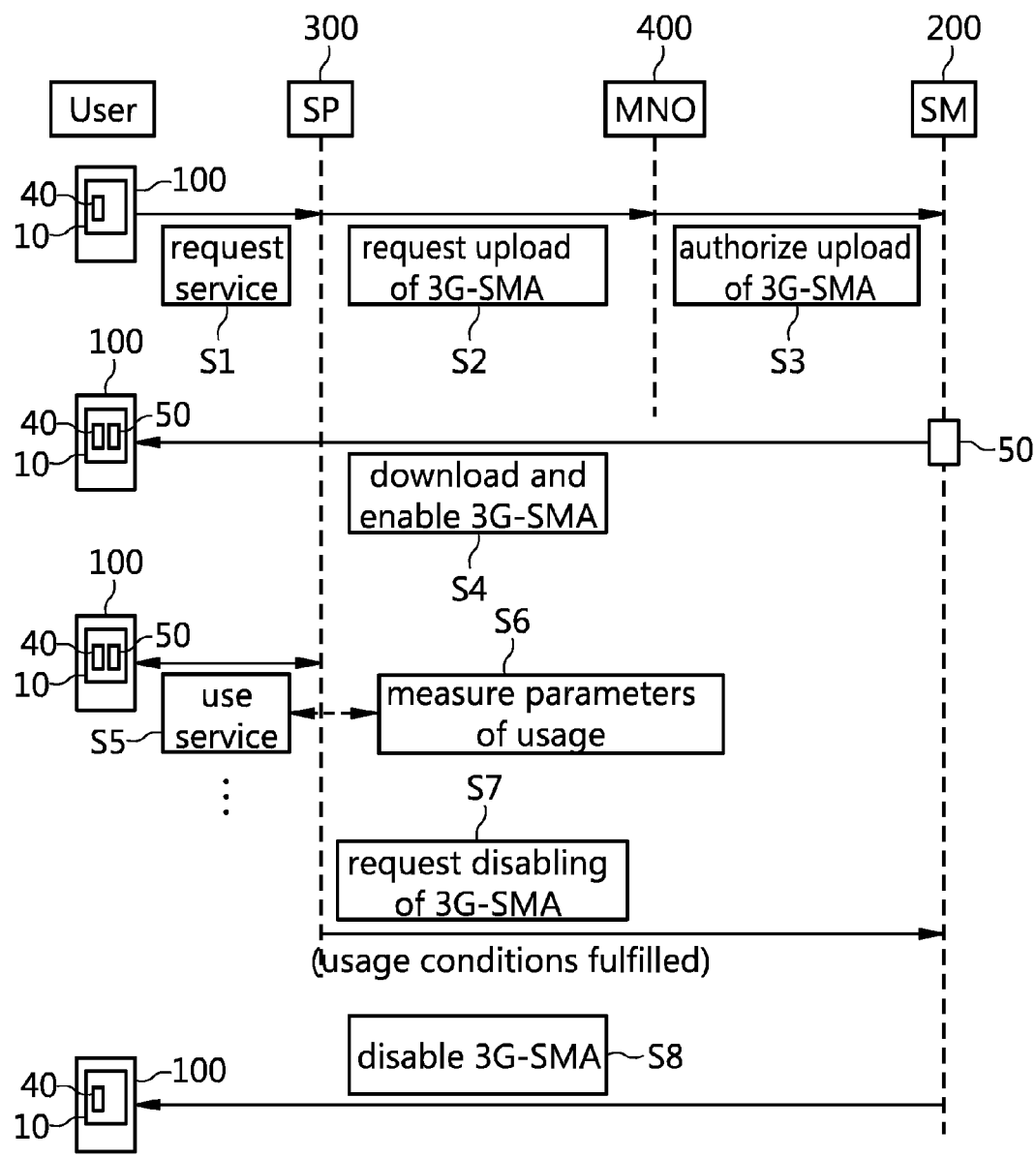

SUBSCRIPTION MANAGEMENT

BACKGROUND

The present invention relates to a method, a security element and an end device which respectively support a flexible subscription management.

Users of mobile end devices, such as for example mobile radio end devices, smartphones, wearables or tablets, may access to a data communication network of a certain network operator if they have a user subscription for this network.

For the mobile end device the user subscription is typically implemented by an application installed in a security element of the user's mobile end device, a so-called user subscription application. This application has for example the task of securely storing and managing access data that are necessary for accessing the network operator's data communication network, for example an access key. As a security element there can be provided for example a (U)SIM mobile radio card.

Within the communication system the network is responsible to check and control any conditions existing for the subscriber, e.g. limiting a data communication of the user over the network. In particular, there is normally established an upper limit of a data volume that is available per time unit, such as for example 300 megabytes per month. A data communication beyond such a limit is then impossible, or only possible on conditions that are disadvantageous to the subscriber (higher price, lower data transfer rate, etc.).

It is assumed that systems have been proposed in which the existing usage monitoring means in the communication network is adapted to ignore predefined monitoring results. This could e.g. enable the network operators to administrate the mobile device via the network without having to consider the available subscriber's data volume.

Such solutions however may have several disadvantages. On the one hand, the solution may become complex in view of roaming situations and/or coexisting mobile communication networks based on different technologies. Further, according to such solutions, the network operator typically loses information required for adjustments that might be necessary in terms of insufficient network capacities. It remains unclear for example which network operator might possess insufficient capacities at which times in which region.

EP 2 437 530 A1 uses a payment application executed in a trusted execution environment of a terminal in order to pay for the download of a network subscription application into the same execution environment. US 2013/0227137 A1 detects the actual usage of a user's network subscription for reserving resources in a cloud service environment if potentially required only. FR 2 945 143 A1 relates to the parallel use of multiple contactless (NFC) payment applications on a SIM card. EP 2 693 784 A1 describes a SIM card including multiple network subscriptions and additional payment service access data, wherein one subscription is selected based on criteria like dates, QoS, coverage or location. EP 2 693 784 A1 discloses the preamble portion of claim 1.

SUMMARY

The object of the present invention is therefore to take account of the stated disadvantages.

According to a preferred embodiment, a method according to the invention for making a service associated with a service provider available to a user via a mobile end device which comprises a security element, and in which a user subscription application can be installed, comprises a step of incorporating a service-provider subscription application associated with the service provider into the security element. The service-provider subscription application is different from and independent of the user subscription application. The service-provider subscription application is basically similar to the user subscription application in that the service-provider subscription application also securely stores and manages access data for accessing a network. Although the service-provider subscription application is installed on the user's end device, a data communication carried out on the basis of the service-provider subscription application will not affect the subscriber. As set forth above, both subscriptions are network subscriptions (comprise access data for accessing a network). In the following and above it is at least partly referred to a possible but only preferred implementation of a subscription, the subscription application.

The service-provider subscription application is employable in parallel to a user subscription application that might be present on the security element. Parallel employability means here in particular that both a user subscription application can be activated and, at the same time, the service-provider subscription application. In other words, user subscription application and service-provider subscription application do not interfere with each other and can be employed quasi-simultaneously for the services and/or applications associated with the respective subscription application. Both the service provider subscription application and the subscription application can be activated independently and/or can be activated when used. Activation (and deactivation) of the subscription applications is controlled by a subscription control application.

The service associated with the service provider thus becomes utilizable on the basis of the service-provider subscription application independently of a user subscription application. In this way there can be made available to the user, without charging the data communication resulting from the service to the user subscription, a utilization of the service which can be exactly tracked and controlled via the service-provider subscription application. The service provider is able to monitor the nature and extent of utilization—on the basis of the conditions established via the service-provider subscription application. The network operator of the service provider can track the effected data communication exactly as consumed and assign it in the conventional manner to a subscriber, namely to the service provider instead of the user.

Therefore, a security element according to the invention comprises, according to a preferred embodiment, a service-provider subscription application associated with a service provider. The security element here is arranged to be integrated into a mobile end device or is present as an integral part of a mobile end device. Some examples of suitable security elements are a (U)SIM mobile radio card which can be integrated into an end device, and a security element formed by suitable software means and/or hardware means in the mobile radio end device in the form of a TEE, a so-called "trusted execution environment".

A TEE preferably is a trusted execution environment in accordance with the TEE Global Platform Specification. A TEE can be provided as a software module, as a software module secured by hardware features, like secure booting based on dedicated booting memory areas, or as a hardware module.

However, a TEE is preferably realized by providing two execution environments on the same processor in parallel, namely a so-called "normal execution environment" (like Android or Windows Phone) and the TEE as a "secure execution environment". The TEE is separated from the normal execution environment based on hardware features, for example a secure boot process for the TEE, a secure execution environment switching, dedicated TEE memory and/or booting memory or privileged hardware access. An accordingly arranged processor may be based for example on the known ARM TrustZone® technology.

The security element here is arranged such that the service-provider subscription application is employable in the hereinabove explained manner parallel to a user subscription application installed on installable on the security element. A service associated with the service provider thus becomes utilizable on the basis of the service-provider subscription application, independently of a user subscription application that might be present on the same security element.

The stated service associated with the service provider can be configured in diverse ways. The service can consist for example in a service provider making specific data, for example music streams or video streams, available over a data communication network. This can require the user to install in his end device an application (a so-called "app") made available by the service provider. Other services might not require the installing of such an application. The service can finally also consist merely in the service provider enabling the installation on the end device of an application made available by the service provider, without further data being downloaded later by means of this application. An example here would be the one-time download of map material for a geographical application or the like.

A utilization of the service associated with the service provider on the basis of the service-provider subscription application is to be understood in particular to mean that at least a portion of the data communication resulting within the framework of the installation of an application associated with the service and/or of the utilization of the service, said communication being effected over a data communication network of a certain network operator, is not charged by the network operator to the user subscription, but rather to the service-provider subscription application installed on the security element according to the invention, said application being the technical representation of a service-provider subscription.

The present invention offers numerous advantages. A service provider need only agree with individual network operators that the network operator with which a user has a contractual relationship shall permit the described service-provider subscription application to be installed on the corresponding security element of the user. The installation itself can be effected by a trustworthy third entity, for example a so-called subscription manager.

The described procedure further has the advantage that both network operator and service provider are able to exactly monitor which users consume data for the prescribed services over which networks within which framework. Thus, an accounting between network operator and service provider can also be effected in dependence on the data volume that has actually flowed. Finally, necessary capacities can be adjusted in a targeted manner.

It is further advantageous that an existing infrastructure can continue to be used unchanged on the part of the network operator. In other words, no structural changes are necessary in how the network is built up and how different subscriptions are managed. The service-provider subscription provided according to the invention can be treated by the network operator substantially like an ordinary user subscription. Implementing the service-provider subscription application on the user's security element does not cause any special technical difficulties either.

Finally, the service-provider subscription can be defined by the service provider such that the latter itself can retain control of how long the subscription is to be valid for an individual user, for example, and how big the data volume permissible within the framework of the subscription is to be, for example. Corresponding limits can be monitored and adjusted by the network operator and/or the subscription manager as agreed upon with the service provider.

Summing up, the present invention enables a flexible management of several diverse subscriptions on a security element of a user's mobile end device. In this way a simple and secure method is made available for managing and processing resource-intensive services over a data communication network. The novel employment and combination of basically known concepts according to the invention gives rise to new ways of utilizing corresponding services without it being necessary for network operators to adjust existing structures. The conventional systems of management, tracking and accounting can also continue to be operated unchanged.

As mentioned above, a user's security element can, according to a preferred embodiment, comprise different types of subscription applications. In addition to one or several service-provider subscription applications, a security element can comprise in particular a conventional user subscription application.

Preferably, the security element is arranged to recognize different types of subscription applications and to treat them differently in dependence on the recognized type. With regard to different user subscription applications that might be present, it is normally provided that only exactly one of these user subscription applications can be activated at any one time. By contrast, it is provided that different service-provider subscription applications can be activated simultaneously with each other. Finally, it is to be possible that a service-provider subscription application is activated simultaneously with a currently activated user subscription application.

As already indicated, the installing, activating and the establishing and adjusting of general or special conditions with regard to an employability of a service-provider subscription application can be effected through an external subscription control service. Normally this is done in the known manner "over the air" (OTA) and in a manner transparent to the user of the security element.

Such a subscription control service can be located for example with the network operator or advantageously with a third entity. The subscription control service is also designated a subscription manager. Such a subscription manager can for example monitor an intended time lapse of a service-provider subscription and deactivate the service-provider subscription application or delete it from the security element when the subscription lapses. Further, the subscription manager can establish and monitor which data volume can be transferred in which time period via a given service-provider subscription. Finally, a subscription control service can stipulate or condition which services and/or applications are utilizable via a certain service-provider subscription application.

The fact that a conventional user subscription application can be employed simultaneously with a service-provider subscription application on the security element can find expression for example in the security element comprising on one side a first communication application associated with the service-provider subscription application and comprising on the other side a further communication application associated with the conventional user subscription application. The first communication application associated with the service-provider subscription application will carry out a data communication over the communication network on the basis of the service-provider subscription application. The further communication application associated with the conventional user subscription application, however, will carry out a data communication on the basis of the user subscription application. The term "communication application" is to be understood broadly here to the effect that the installing and/or executing of the communication application on the security element or end device of the user requires a data communication over a network operator's data communication network at some time, for example at the time of installation of the application, or also during the further utilization of the application.

In so doing, it is transparent to the user of the end device on the basis of which subscription a corresponding data communication is being effected. Normally, the user of the end device will notice an installation of one or several service-provider subscription applications at most indirectly by a utilization of a service associated with a service-provider subscription not being deducted from the contingent of the conventional user subscription.

A mobile end device according to a preferred embodiment of the present invention comprises a described security element. The security element can be integrated here into the end device in the conventional manner, for example in the form of a (U)SIM mobile radio card. Alternatively, the security element can also be configured as an integral part of the end device, for example in the form of a hereinabove described TEE.

To enable the employability of a service-provider subscription application to be controlled and stipulated more exactly, the end device can comprise a subscription control application which is arranged to control an association of services and/or applications with different subscription applications present on the security element, preferably according to stipulations or conditions of the above-mentioned subscription control service. The subscription control application is preferably configured as part of an operating system of the end device and is also designated a subscription manager agent.

Normally, the subscription control application is arranged to communicate with the external subscription control service via an over-the-air (OTA) interface to request and/or to receive conditions for subscription control. In other words, the subscription control application relies substantially on conditions of the subscription control service, but can then execute these conditions autonomously in the end device. In this way the external subscription control service can be relieved. A data communication between security element or end device and subscription manager, which is necessary for controlling and managing service-provider subscription applications in the end device, can be minimized. Further, essential control tasks can be effected efficiently and directly in the end device, thereby enabling execution speed and efficiency of the control tasks to be increased altogether.

The manner of associating services and/or applications with different (service-provider) subscriptions in the security element can be effected in different ways. Preferred embodiments of such an association are to be described hereinafter by way of example.

On the one hand, the subscription control application can be arranged to access a subscription condition, preferably stored in a secure region of the end device, in order to determine which services and/or applications are to be employed on the basis of which subscription applications installed in the security element. The stated subscription condition can be present for example in the form of a table or the like. The table can state in particular over which networks and/or interfaces different data packets are to be routed.

The subscription control application is preferably arranged to adjust such a subscription condition in dependence on conditions received from the external subscription control service. The external subscription control service can prompt the subscription control application for example to adjust a routing table stored in the security element to the effect that data packets for a stipulated service provider are routed in a stipulated network, over a stipulated gateway and on the basis of the service-provider subscription application associated with the service provider, whereas the remaining data traffic is routed for example over a standard gateway on the basis of the user subscription application.

A second manner of associating a service or application with a service-provider subscription application can comprise recognizing a client application executable on the end device and associating this client application with a service-provider subscription application installed on the security element. The subscription control application on the end device here can comprise in particular a network proxy application or the like. In this way it can be ensured that only stipulated client applications on the end device which call up services of a stipulated service provider can utilize the service-provider subscription application associated with the service provider on the end device.

Finally, it can be provided that the subscription control application is arranged, for example again by means of a network proxy, to sign data packets received from a client application and intended for a service provider with a datum associated with the service provider for unique recognizability for the service provider. The service provider can then uniquely identify corresponding data packets by the signature and for example block received requests that have no signature, because they have been sent to the service provider directly, circumventing the subscription control application.

BRIEF DESCRIPTION OF THE DRAWINGS

The present invention will hereinafter be described by way of example with reference to the attached drawings. There are shown.

DETAILED DESCRIPTION OF VARIOUS EMBODIMENTS

Figure 1:
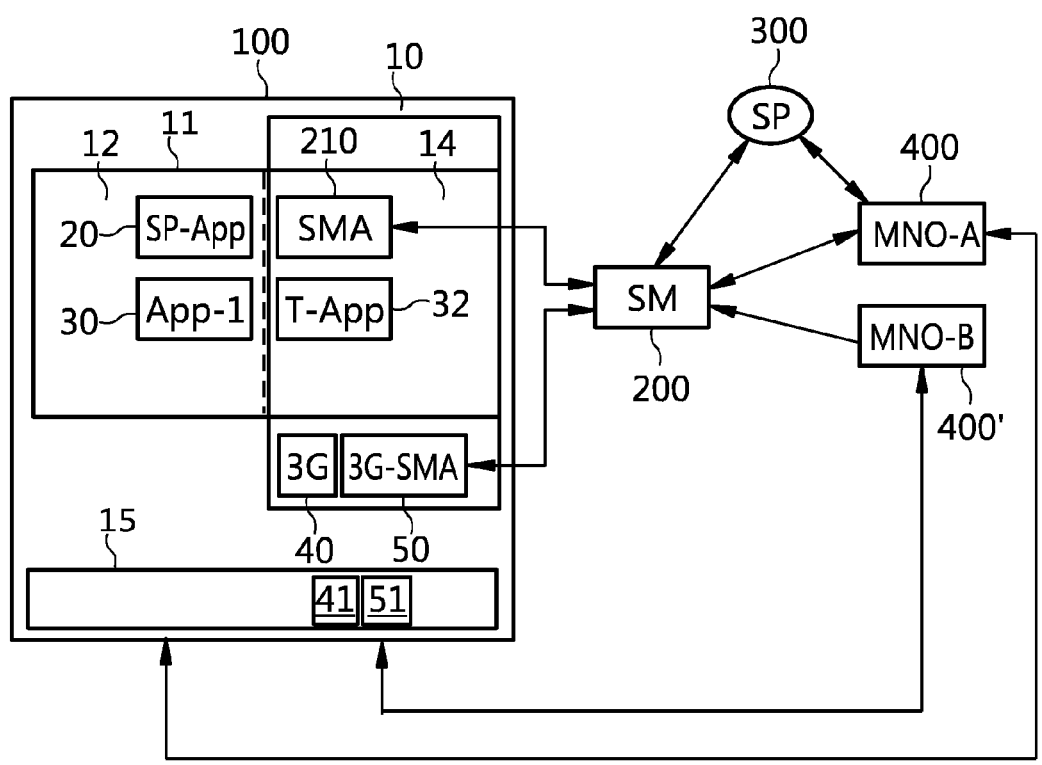
FIG. 1 components and entities involved in a subscription management according to a preferred embodiment of the present invention.

FIG. 1 shows a mobile end device 100, a service provider 300, mobile network operators 400, 400' and a subscription manager 200. As well known in the art these entities being arranged in and/or mutually connected via at least network (not shown), e.g. a telecommunication network and/or an IP based network.

The utilization of a service of the service provider 300 by a user can be effected by means of the mobile end device 100. The service provider 300 can offer for example music data or video data to be downloaded. This can require the user to install a special application 20 associated with the service provider in the end device 100 and/or the security element 10. The utilization of the service can also be confined to an installation of such an application 20.

As an end device 100 there can be employed for example a smartphone or a tablet computer. The end device 100 comprises a security element 10 in the form of a TEE 14 ("trusted execution environment") illustrated schematically in FIG. 1.

Only one security element 10 is illustrated in FIG. 1, however multiple security elements may be present. In addition to the TEE 14 as a first security element 10 there could be provided a hardware security element as a second security element, e.g. a SIM card or an embedded SIM.

A processor 11 of the end device 100 comprises a first insecure execution environment 12 and a second secure execution environment 14, the TEE, separated therefrom. The insecure execution environment 12 can be a conventional operating system, for example Android. The trusted execution environment 14 is a security operating system, for example T-Base®. The TEE operates in accordance with the TEE Global Platform specifications. Different applications 20, 30, 32 can be stored and/or executed in the insecure region 12 and in the TEE 14. Normal applications 20, 30 executed in the normal execution environment 12 could be called apps. Secure applications executed in the secure execution environment 14 may be called Trustlets®.

To obtain access to a data communication network of a network operator 400, 400' ("mobile network operator", MNO), there is located on the security element 10 a user subscription application 40 which in particular securely stores and manages access data required for accessing the network.

A service-provider subscription application 50 to be described hereinafter in detail enables access to the data communication network analogously, whereby a data communication carried out within the framework of such an access is not assigned to the user, but to the service provider 300 (SP) with which the service-provider subscription application 50 is associated.

As illustrated in FIG. 1 the subscription application 40 and the service-provider subscription application 50 can be executed in the TEE 14. However, the subscription application and/or the service-provider subscription application 50 can be executed on a second security element as well. Generally, multiple user subscription applications 40 and/or multiple service provider subscription applications 50 may coexist on the end device 100.

For providing access to the network the end device 100 may comprise a second processor 15 (baseband processor). In the end device 100 a network process 41, 51 per subscription may be executed. Since standards allow only one subscription to be activated (usable) at a time, the common solution would comprise only a single network process. In the present solution, for enabling parallel usability of two subscriptions 40, 50, parallel network processes 41, 51 could be provided. Each network process thus uses one of the subscription applications. However, a single network process 41 could as well be adapted to provide network access based on more than one subscription application in parallel.

The (remote) subscription manager (SM) or subscription control service 200, which can be made available for example by an independent, third entity but also by a network operator 400, can install, adjust and deactivate applications, e.g. the service-provider subscription application 50, on the security element(s) 10 of the user's mobile radio end device 100. The subscription control service 200 may act on request of the service provider 300 and/or in consultation with the network operator 400. For this purpose, there can be provided on the end device 100 a subscription control application 210, also called a subscription manager agent (SMA), which can autonomously carry out some aspects of control and adjustment in cooperation with the subscription manager 200 in a manner to be described more exactly hereinafter.

The subscription manager 200 can carry out the installation and management of the subscription applications 50 on the security element 10 via the over-the-air (OTA) interface. The subscription control application 210 receives for this purpose corresponding stipulations or conditions from the subscription manager 200. Analogously, the subscription control application 210 can send requests to the subscription manager 200, for example in order to obtain conditions on applications newly installed on the end device 100 and/or the security element 10 with regard to an association with a subscription application 40, 50.

Figure 2:
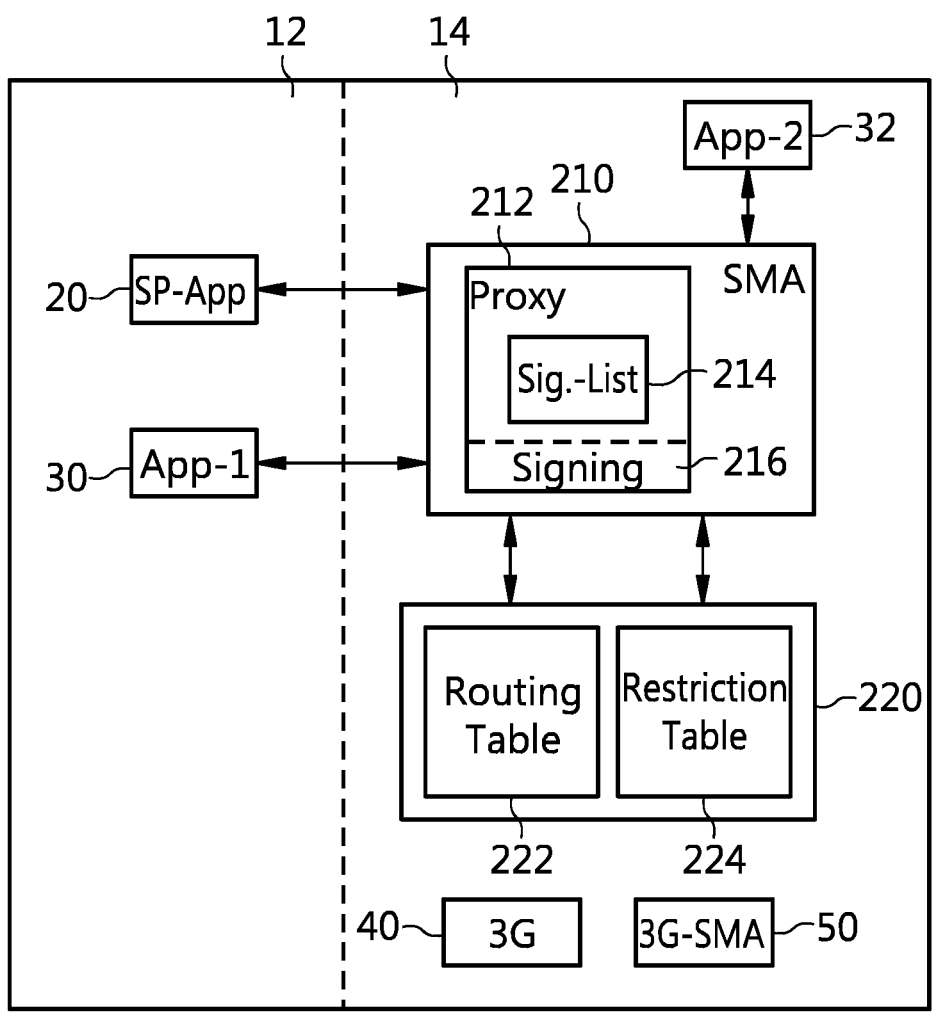
FIG. 2 a preferred embodiment of a security element according to the invention having applications and condition data stored therein, and FIG. 3 essential steps in connection with the employment of a service-provider subscription application.

As represented by way of example in FIG. 2, the subscription control application 210 can comprise different components and access different further condition data 220 in order to control an association of different applications 20, 30, 32 executed in the normal execution environment 12 or in the security element 10 with different subscription applications 40, 50.

To establish for example which data packets are to be transferred via which gateways and on the basis of which subscription applications 40, 50 within the framework of a data communication of the end device 100 with an external communication partner, the subscription control application 210 can access a routing table 222 and change or adjust it, where applicable.

As schematically represented hereinafter in Table 1, the routing table provides in its original form that every external data communication is carried out based on the user subscription application 40 (3G) and over the standard gateway 1.2.3.4. It should be considered that the subscription applications 40, 50 typically do not forward the communication themselves but are used by the end device, e.g. a network process, when accessing the network.

TABLE 1

| Original routing table 222 | | | |
|---|---|---|---|
| Destination | Netmask | Gateway | Interface |
| 127.0.0.0 | 255.0.0.0 | 127.0.0.1 | IO |
| 255.255.255.255 | 255.255.255.255 | 1.2.3.4 | 3G |
| 0.0.0.0 | 0.0.0.0 | 1.2.3.4 | 3G |

To enable a data communication to be carried out within the framework of a service made available through the service provider 300 in the network 10.10.10.x over a separate gateway 5.6.7.8 and on the basis of the service-provider subscription application 50 (3G-SMA), the subscription control application 210 can accordingly adjust the routing table 222 at the prompting of the subscription manager 200, as shown in Table 2.

TABLE 2

Routing table 222 after adjustment

| Destination | Netmask | Gateway | Interface |
|---|---|---|---|
| 127.0.0.0 | 255.0.0.0 | 127.0.0.1 | IO |
| 10.10.10.x | 255.255.255.0 | 5.6.7.8 | 3G-SMA |
| 255.255.255.255 | 255.255.255.255 | 1.2.3.4 | 3G |
| 0.0.0.0 | 0.0.0.0 | 1.2.3.4 | 3G |

Normally, the routing table 222 is stored in a secure environment 14 of the security element 10, so that only privileged applications, such as for example the subscription control application 210, can perform a modification of the routing table 222.

The control of the routing of different data packets is normally effected, as explained, merely on the basis of the target address, independently of a client application triggering the data communication.

Generally, the TEE 14 (and or a further security element) may store multiple subscriptions. The security element 10 will be adapted to ensure that only one user subscription (application) will be activated at a time. A subscription activated can be used by the end device 100, e.g. by the network process. In contrast thereto a deactivated subscription cannot be used for authenticating and/or identifying the end device to the network. The security element 10 could allow multiple service-provider subscriptions (applications) to be activated in parallel.

The SMA 210 may be adapted to switch the service-provider subscription application based on the destination address. If the destination address does not correspond to the currently activated service-provider subscription application but to a further service-provider subscription application, the SMA 210 performs the following steps. The SMA 210 deactivates the currently activated service-provider subscription application 50 and activates a further (not shown) service-provider subscription application. Furthermore, the SMA 210 may trigger restart of a process in the end device, such as the above-mentioned network process, the process using the service-provider subscription application.

A further mechanism for producing an association of a client application 20, 30, 32 on the security element 10 with a subscription application 40, 50 can be effected on the part of the subscription control application 210 by means of a proxy functionality 212. This mechanism now additionally considers the identity of a client application 20, 30, 32. Although the proxy functionality 212 is illustrated as a part of the subscription control application 210 it could as well be provided as a separate component of the security element 10 or the TEE 14.

For this purpose, the entire data communication between a client application 20, 30, 32 and an external communication partner is routed over the proxy 212. The proxy 212 is arranged to recognize and to identify an application 20, 30, 32 by its signature. Dependent on the application identity the proxy 212 determines based on which subscription application 40, 50 a data communication requested by the client application 20, 30, 32 can take place.

For example, the service-provider application 20 associated with the service provider 300 will be recognized by its signature and be associated with the service-provider subscription application 50. The remaining applications 30, 32 installed on the security element 10 are recognized in the same way by the proxy 212 by their (wrong, missing correct and/or missing) signature as not to be associated with the service provider 300 and are accordingly associated with the ordinary user subscription application 40.

To ascertain which signatures of client applications 20 are to be regarded as to be associated with the service provider 300, the proxy 212 can access a signature/signer list 214 ("white list").

The proxy functionality 212 can further be arranged to sign data packets directed to the service provider 300 by means of a signature functionality 216. The signature is effected here with a datum or key associated with the service provider 300. In this way the service provider 300 can immediately recognize whether the data packets have been routed via the proxy functionality 212, and hence on the basis of a correctly associated subscription application 50.

Besides the routing table 222, the condition data 220 used by the subscription control application 210 for controlling and adjusting the subscription application 50 can comprise for example a restriction table 224. Therein can be stored for example in which manner a utilization of the service-provider subscription applications 50 is limited, for example with regard to a maximum data transfer volume, a utilization time and further possible restriction parameters (roaming; dependence on time of day, weekday, etc., type of terminal).

While the making available of a service-provider subscription application 50 basically allows the possibility of not carrying out via the ordinary user subscription application 40 a data communication that becomes necessary through the employment of a service provider's service, a finer coordination and adjustment can be effected within the framework of the subscription management by means of the subscription control application 210. In this way it becomes possible for example to carry out a data communication via the service-provider subscription application 50 up to a stipulated maximum data volume, but to then continue any further data communication on the basis of the user subscription application 40. Further, there is the possibility to activate the service-provider subscription application 50 only for a stipulated time period or on stipulated weekdays.

With reference to FIG. 3 there will be described by way of example a scenario which shows how a service-provider subscription application 50 (3G-SMA) can be installed and activated, employed and deactivated.

In a step S1 a user requests via his end device 100 a service of a service provider 300. The user's end device 100 comprises in the described manner a security element 10 on which a conventional user subscription application 40 is installed.

The service provider 300 offers the service such that any data communication resulting in connection with the service is not to be billed to the user, provided that the data communication does not exceed a stipulated maximum volume and the service is only utilized in a stipulated time period.

To enable the user to employ the service in the described manner, the service provider 300, in step S2, asks the network operator 400 with which the user is connected according to his user subscription application 40 for permission to install a service-provider subscription application 50 associated with the service provider 300.

The network operator 400, in a subsequent step S3, authorizes a subscription manager 200 to install a corresponding service-provider subscription application 50 associated with the service provider 300 in the security element 10 of the user's end device 100 and to activate it, as represented with reference to step S4.

From now on the user can utilize the service of the service provider 300 on the basis of the specific service-provider subscription application 50, as represented with reference to step S5. Such utilization can be monitored by the service provider 300 and/or the network operator 400, as illustrated with reference to step S6, for example with regard to the maximum allowed data volume and the utilization times.

When the agreed utilization time lapses or when the agreed data contingent is used up, the service provider 300, in step S7, asks the subscription manager 200 to deactivate or delete the service-provider subscription application 50 from the security element 10. Step S7 could as well be performed by the network operator 400.

The subscription manager 200 thereupon deactivates or deletes the service-provider subscription application 50 on the security element 10 of the user's end device 100 in step S8.

The invention claimed is:

1. A security element comprising a user network subscription and a second network subscription,
    the security element is arranged such that the second subscription is employable in parallel to the user subscription,
wherein
    the second network subscription is a service-provider subscription associated with a service provider, and
    the service associated with the service provider becomes utilizable on the basis of the service-provider subscription.

2. The security element according to claim 1, wherein the security element comprises different types of subscriptions and is arranged to recognize different types of subscriptions and to treat them in dependence on their type.

3. The security element according to claim 1, wherein the security element is arranged to control the number of subscriptions that can be activated concurrently in dependence on the subscription type.

4. The security element according to claim 1, wherein the security element is adapted to ensure that only one user subscription is activated.

5. The security element according to claim 1, wherein the security element is adapted to allow service-provider subscriptions to be activated concurrently.

6. The security element according to claim 1, wherein the security element comprises a first communication application associated with the service-provider subscription, and a second communication application associated with the user subscription.

7. An end device having a security element according to claim 1.

8. The end device according to claim 7, characterized by a subscription control application which is arranged to control an association of services and/or applications with different subscriptions present on the security element.

9. The end device according to claim 8, wherein the subscription control application is part of an operating system of the end device.

10. The end device according to claim 8, wherein the subscription control application is arranged to communicate with an external subscription control service in order to ask for and/or to receive conditions for subscription control.

11. The end device according to claim 8, wherein the subscription control application is arranged to access a subscription condition in order to determine which services and/or applications are to be employed on the basis of which subscription applications.

12. The end device according to claim 10, wherein the subscription control application is arranged to adjust the subscription condition in dependence on conditions received from the subscription control service.

13. The end device according to claim 7, wherein the subscription control application is arranged to identify a client application executable on the end device and to associate it in dependence thereon with one of the subscriptions installed on the security element.

14. The end device according to claim 8, wherein the subscription control application is arranged to sign data packets received from a client application and intended for a service provider with a datum associated with the service provider for unique recognizability for the service provider.

15. A method for making a service associated with a service provider available to a user via a mobile end device having a security element, wherein the security element comprises a user network subscription, comprising the step of incorporating a service-provider network subscription associated with the service provider into the security element, wherein the service-provider subscription is employable parallel to a user subscription, and the service associated with the service provider becomes utilizable on the basis of the service-provider subscription independently of the user subscription.

16. The method according to claim 15, wherein the employability of the service-provider subscription is controlled through an external subscription control service and, where applicable, additionally through a subscription control application of the end device according to conditions of the external subscription control service.

* * * * *